United States Patent [19]

Uchikata et al.

[11] Patent Number: 4,672,393

[45] Date of Patent: Jun. 9, 1987

[54] THERMAL PRINTER

[75] Inventors: Yoshio Uchikata, Yokohama; Mineo Nozaki, Kawasaki; Osamu Asakura, Tokyo; Masasumi Nagashima, Yokosuka, all of Japan

[73] Assignee: Canon Kabushiki Kaisha, Tokyo, Japan

[21] Appl. No.: 714,056

[22] Filed: Mar. 20, 1985

Related U.S. Application Data

[63] Continuation of Ser. No. 438,974, Nov. 3, 1982, abandoned.

[30] Foreign Application Priority Data

Nov. 13, 1981 [JP] Japan ............................... 56-182646

[51] Int. Cl.[4] .......................... G01D 15/10; B41J 3/20

[52] U.S. Cl. ................................ 346/76 PH; 400/120

[58] Field of Search ................... 346/76 PH; 219/216; 400/120

[56] References Cited

U.S. PATENT DOCUMENTS

| | | | |
|---|---|---|---|
| 3,792,481 | 2/1974 | Nagashima et al. | 346/1.1 X |
| 4,249,186 | 2/1981 | Edwards | 346/35 X |
| 4,250,511 | 2/1981 | Stein et al. | 346/76 |
| 4,300,142 | 11/1981 | Kos | 346/76 PH |
| 4,395,718 | 6/1983 | Murayama et al. | 346/135.1 |
| 4,427,985 | 1/1984 | Kikuchi et al. | 346/1.1 X |

FOREIGN PATENT DOCUMENTS

| | | | |
|---|---|---|---|
| 2921120 | 12/1979 | Fed. Rep. of Germany | 400/120 |
| 56-148591 | 11/1981 | Japan . | |

OTHER PUBLICATIONS

Edgar, A., et al., "Color Thermal-Transfer Printing", *IBM Technical Disclosure Bulletin, vol. 23, No. 7A, Dec. 1980.*

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A thermal printer adapted for multicolor printing is provided with a thermal head which is driven according to information of color of character or image to be printed. The color information is previously stored in a memory. The multicolor ribbon used in the printer is composed of different color inks having different melting points coated in layers on a base film. In driving the thermal head, the amount of thermal energy generated from it is changed by changing the applied voltage to it and/or the driving time of it to perform multicolor printing with the multicolor ink ribbon.

6 Claims, 8 Drawing Figures

THERMAL PRINTER

This application is a continuation of application Ser. No. 438,974 filed Nov. 3, 1982, now abandoned.

BACKGROUND OF THE INVENTION

1. Field of the Invention

The present invention relates to a thermal printer adapted for multicolor printing.

2. Description of the Prior Art

Many attempts have been made to provide a thermal printer adapted for multicolor printing. However, thermal printers for multicolor printing previously proposed are all unsatisfactory since they have many practical problems.

SUMMARY OF THE INVENTION

Accordingly it is an object of the invention to provide an improved thermal printer.

It is another object of the present invention to provide a thermal printer which has memory means for storing color data related to the information to be recorded by the thermal head.

It is a further object of the present invention to provide a thermal printer adapted for multicolor printing which includes means for changing the amount of thermal energy from the thermal head according to the color of the recording ink.

It is still a further object of the present invention to provide a multicolor printing apparatus which is simple in construction, small in size and not expensive and which enables high speed printing.

It is another object of the present invention to provide a multicolor ink ribbon with which multicolor printing can be carried out very economically.

Other and further objects, features and advantages of the present invention will be apparent from the following description taken in connection with the accompanying drawings.

DESCRIPTION OF PREFERRED EMBODIMENTS

Figure 1:
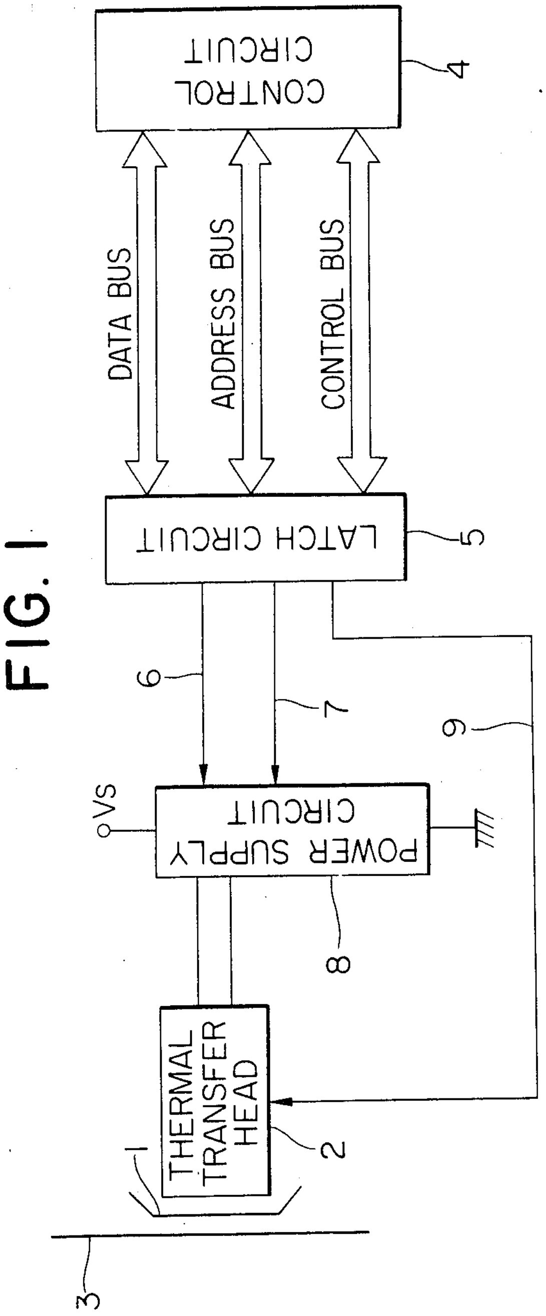
FIG. 1 is a circuit block diagram showing an embodiment of the present invention.

In the FIG. 1 embodiment of the present invention, 1 is a multicolor ink ribbon comprising heat fusible ink layers the structure of which will be described in detail later herein. 2 is a thermal transfer head by which the ink ribbon is pressed against a recording paper 3 supported on a platen (not shown). 4 is a control circuit for controlling the application voltage and the application time of driving signals to be applied to heat generating elements (not shown) in the thermal transfer head 2. The control circuit 4 determines the voltage and time depending on a color designation signal related to a pattern signal derived from the character, image or the like to be printed. To this end, for example, a correlation table of color designation signal—voltage·time is stored in a read-only memory (ROM).

The control circuit 4 produces a voltage control signal and a time control signal. These output signals from the control circuit 4 are provisionally latched by a latch circuit 5 and are then transmitted to a power supply circuit 8 through voltage data line 6 and time data line 7. In response to the voltage and time control signals, the power supply circuit 8 drives the thermal transfer head 2. The latch circuit 5 latches also the pattern signal of the character, image or the like to be printed coming from the control circuit 4. The pattern signal is also transmitted to the thermal transfer head 2 from the latch circuit through pattern line 9. In the thermal transfer head, any heat generating element to be driven is selected by the pattern signal prior to the reception of a driving signal (see FIG. 2) from the power supply circuit 8. Thereafter, the designated heat generating element is driven by the driving signal with predetermined application voltage $V_H$, application time $T_H$ and pattern.

Figure 7A:
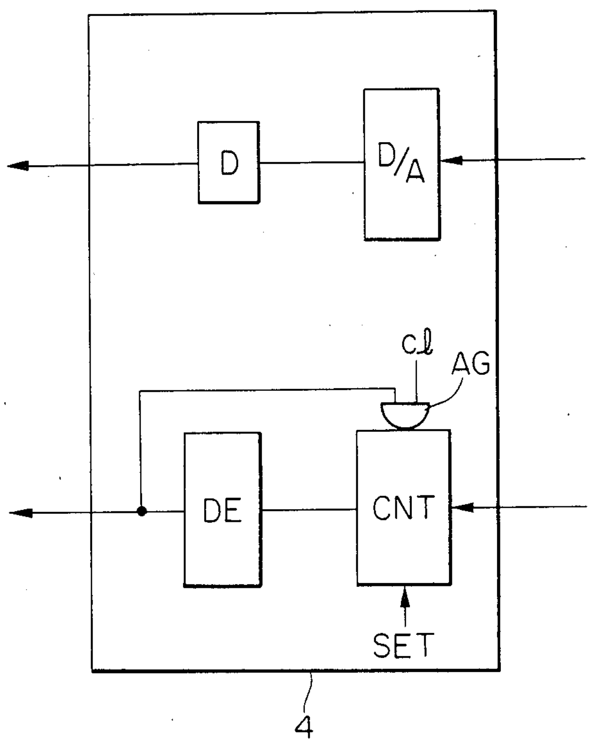
FIGS. 7A and 7B are block diagrams showing embodiments of the power supply circuit.

FIG. 7A is a block diagram of the power supply circuit 8.

In FIG. 7A, D/A is a digital-analog converter by which the voltage signal from the latch circuit 5 is converted into a corresponding analog value. D is a driver for amplifying the output signal from the converter D/A and for applying the amplified signal to the head 2.

CNT is a counter to which the time signal is applied from the latch circuit 5. The time signal is set as an initial value by a set signal SET. The content of the counter CNT is decrementally changed by clock cl. DE is a decoder which generates an output of logic "0" only when the content of the counter CNT has just reached a determined value. All other times the decoder is generating an output signal of logic "1". AG is an AND gate which is controlled by the output signal of the decoder DE to control the application of clock cl to the counter CNT in the following manner:

After the counter CNT is set to a certain initial value for the counter's content, the content of the counter is decrementally changed by clock cl. When the content of the counter has just reached a predetermined value, for example, 0 (zero), the decoder DE generates an output of "0" thereby AND gate AG is closed to stop the counting operation of the counter CNT. From this point in time, the decoder continues generating "0". Since the output signal of the decoder DE is "1" during the operation of the counter CNT, the thermal head driving time is determined by it.

Figure 7B:
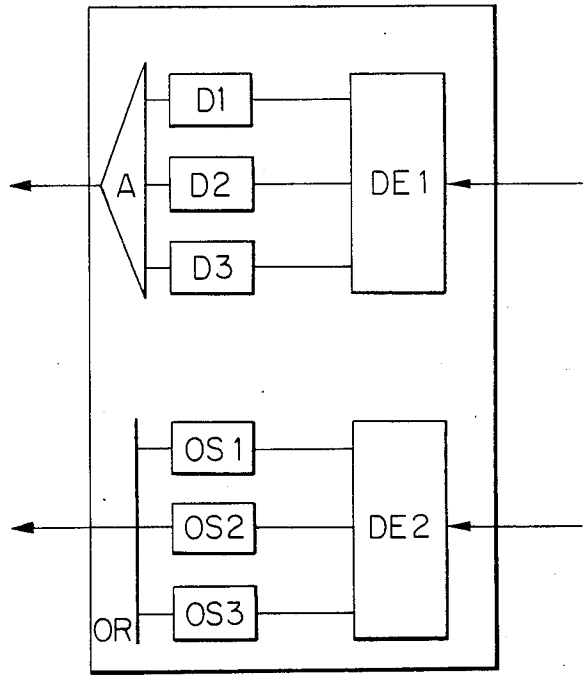

FIG. 7B is a block diagram showing another embodiment of the power supply circuit 8.

In this embodiment, there are provided two decoders DE1 and DE2. The first decoder DE1 decodes the voltage signal coming from the latch circuit 5 to drive selectively voltage circuits D1, D2, D3 which generate voltages different from each other. The outputs of voltage circuits D1, D2, D3 are applied to the thermal head 2 through an adder A.

The second decoder DE2 decodes the time signal coming from the latch circuit 5 to drive selectively three monostable circuits (one-shot circuits) OS1, OS2, OS3 which generate different time signals. The outputs of OS1, OS2, OS3 are applied to the thermal head 2 through an OR gate OR.

In this manner, the output signals from the latch circuit 5 are converted to analog signals.

Figure 3:
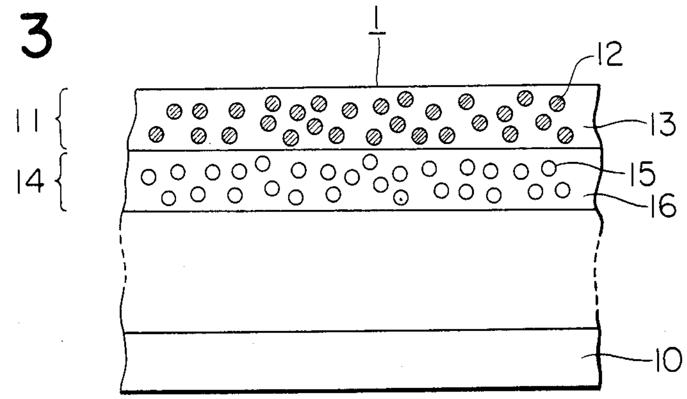
FIG. 3 is a schematic sectional view of a multicolor ink ribbon according to the present invention.

The detailed structure of the multicolor ink ribbon 1 is shown in FIG. 3.

As illustrated in FIG. 3, the ink ribbon is composed of a base film 10 and ink layers coated on the base film. Inks contained in different ink layers are different from each other in color as well as in melting point. For example, the outermost ink layer 11 is formed of a mixture of a color pigment 12 and a binder 13 having a low melting point. The underlying ink layer 14 is formed of a mixture of another pigment 15 and another binder 16. The pigment 15 is different from the pigment 12 in color and the binder 16 has a higher melting point than the binder 13. In this manner, several different ink layers are formed one on another. Therefore, the binder used in the innermost ink layer adjacent to the base film 10 has the highest of all layer melting points. When the temperature of the head is raised by heat from the heat generating element, the top ink layer beings melting first and the bottom ink layer melts last of all.

Figure 4:
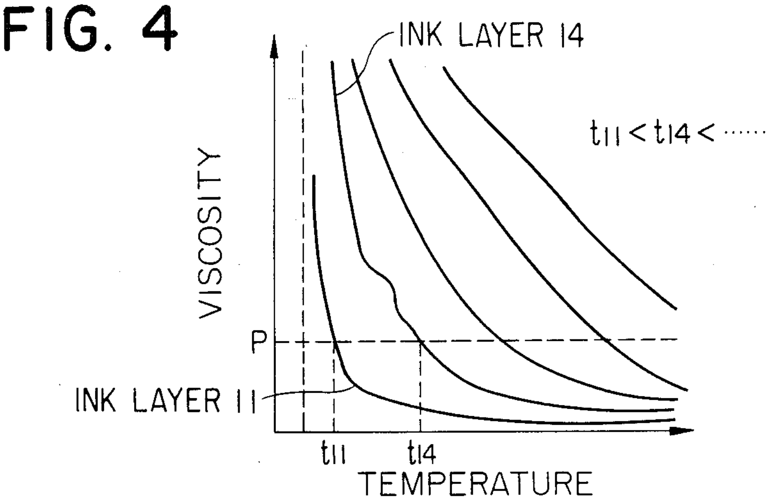
FIG. 4 is a graph showing the melt viscosity characteristic of the ink ribbon.

FIG. 4 shows the melting characteristics of the multicolor ink ribbon 1. Curves in FIG. 4 represent temperature-viscosity characteristics of the individual ink layers in the ink ribbon 1. P indicates the maximum viscosity required for transferring the ink onto a recording paper 3. The ink in a layer of the ink ribbon can be transferred onto the recording paper only when the ink has melted and its viscosity has reached the maximum viscosity P. Since, as previously noted, the different color ink layers in the ink ribbon 1 have different melting points, the temperature at which the ink layers reach the viscosity P is not the same but varies from layer to layer. Referring to the characteristic curve of the ink layer 11, for example, the ink layer 11 reaches the viscosity P already at the temperature of $t_{11}$. The next layer 14 reaches P at the temperature $t_{14}$ which is higher than $t_{11}$. Similarly, the ink layer on the inside of the layer 14 reaches the viscosity P at a higher temperature than $t_{14}$. Therefore, when the multicolor ink ribbon 1 is gradually heated by the thermal transfer head 2, the melting of ink is stepwise advanced from the outermost ink layer to the ink layer. The ink melted first is transferred first onto the recording paper 3. Consequently, the color of ink transferred varies depending on the temperature of the thermal transfer head 2.

Figure 2:
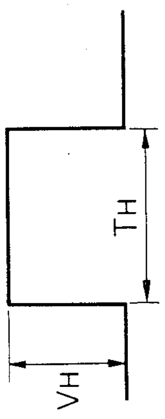
FIG. 2 shows the waveform of a driving signal for driving the thermal transfer head.
Figure 5:
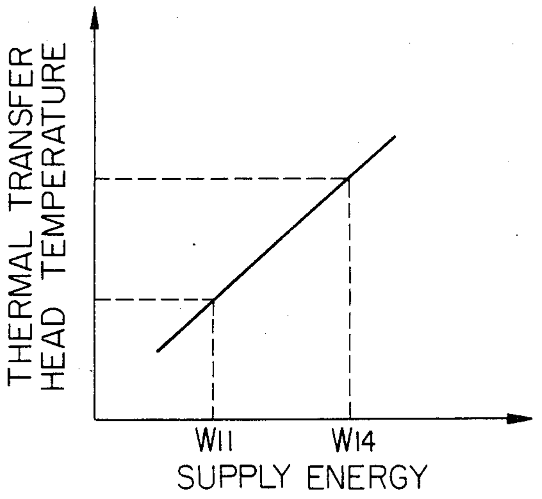
FIG. 5 is a graph showing the temperature-energy characteristic of the thermal transfer head.
Figure 6:
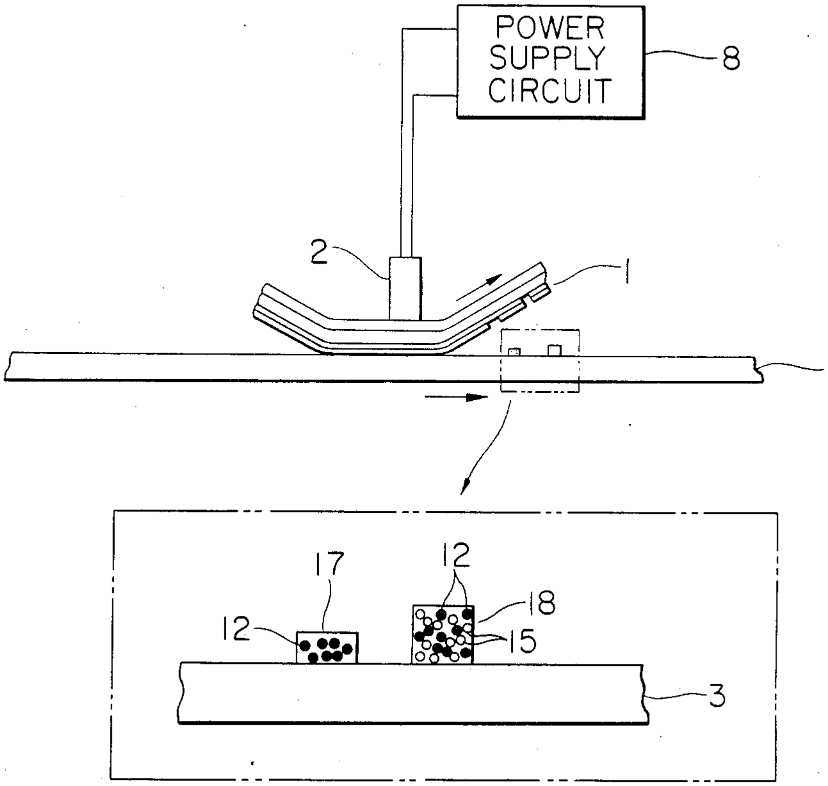
FIG. 6 illustrates the manner of transferring inks from the ink ribbon onto the recording paper by the thermal transfer head.

The manner of operation of the embodiment is as follows:

In a printing data memory (not shown) there is previously stored various information concerning characters or images to be printed. The control circuit 4 applies at first a pattern signal corresponding to the stored information to the thermal transfer head 2 through the latch circuit 5. Next, the control circuit 4 applies a voltage control signal to the power supply circuit 8 through the latch circuit 5. The voltage control signal is generated in accordance with the color designation signal belonging to the stored character or image information. The voltage $V_H$ applied to the head 2 is determined by this voltage control signal. Subsequent to the voltage control signal and in synchronism with the printing timing, the control circuit 4 applies to the power supply circuit 8 a current application time control signal through the latch circuit 5. The time control signal is generated in accordance with the color designation signal to determine the application time $T_H$ during which the electric power is continuously applied to the thermal transfer head 2. Based on the voltage control signal and the current application time control signal, the power supply circuit 8 generates a driving signal as shown in FIG. 2 which is applied to the thermal transfer head 2. The amount of energy supplied to the head 2 is determined by the applied voltage $V_H$ and the duration time of current application $T_H$. The higher the voltage $V_H$ and also the longer the time $T_H$, the large the value of supply energy becomes. FIG. 5 shows the relationship between thermal head temperature and supply energy. As seen from FIG. 5, the temperature of heat generated from the head 2 is determined depending on the value of supply energy. When the level of the supply energy to the head 2 is W11, only the ink layer 11 having the lowest melting point among ink layers in the ink ribbon 1 melts and the ink 17 of the layer containing pigment 12 is thermal-transferred onto the recording paper 3 as illustrated in FIG. 6.

When the amount of energy supplied to the head 2 is increased from W11 to W14, two layers 11 and 14 in the ink ribbon 1 melt. In this case, the ink 18 transferred onto the recording paper 3 is a mixture of two different pigments 12 and 15.

Similarly, if a larger amount of energy is applied to the thermal transfer head, then the ink layers 11, 14 and a further inner ink layer melt together and a mixture of three different pigments is transferred onto the recording paper 3 as a different color ink from the above.

In this manner by suitably controlling the amount of supply energy to the thermal transfer head 2, any desired color ink can be transferred onto the recording paper to attain multicolor printing.

As readily understood from the foregoing, the present invention provides a very simple thermal multicolor printing system. The color of ink transferred onto a recording paper from one and same ink ribbon can be changed simply by changing the amount of heat generated from the thermal transfer head. Therefore, the thermal printer for multicolor printing is simple in structure and small in size. It is not expensive and is suitable for high speed printing. The multicolor ink ribbon according to the present invention is formed by coating different inks having different melting points in layers on a base film sheet. It is no longer necessary to idly feed the ink ribbon. Transferring of ink in any desired color can be performed without idle feed of the ribbon. Therefore, the ink ribbon can be used more economically as compared with the prior art multicolor ink ribbon.

While the present invention has been particularly shown and described with reference to a preferred embodiment thereof, it will be obvious to those skilled in the art that various changes and modifications may be made without departing from the spirit and scope of the present invention.

What we claim is:

1. A printer for forming an image on a recording sheet by transferring ink onto the recording sheet, the printer comprising:

at least one member having a plurality of laminated layers each of a different ink, each ink having a different transfer temperature, wherein said laminated layers are arranged so that the transfer temperature of the ink in each said layer is lower than the transfer temperature of the ink in the immediately underlying layer;

memory means for storing color selection information for selecting a predetermined number of different inks and for storing pattern information, wherein the color selection information stored in said memory means includes at least one of drive voltage information and drive time information for driving a thermal head; and a thermal head driven in accordance with the color selection information and the pattern information stored in said memory means for heating said laminated layers to a temperature sufficient to cause the predetermined number of different inks selected in accordance with the color selection information to mix with each other and for transferring the mixture onto the recording sheet in a pattern corresponding to the pattern information.

2. A printer according to claim 1, further comprising control means, coupled to said memory means and said thermal head, for converting to an analog signal the selection information of said memory means applied to said thermal head.

3. A printer according to claim 1, wherein said memory means includes areas for storing driving voltage information and driving time information, respectively, for driving said thermal head, the driving voltage information and the driving time information being selection information.

4. A printer according to claim 3, further including driving means for driving said thermal head in accordance with driving voltage information and driving time information stored in digital form in said memory means, said driving means including:

voltage converting means for converting the digital driving voltage information into a voltage for application to said thermal head; and timer means for converting the digital driving time information into a time period for which said thermal head is driven, said timer means including down-counter means for counting down from an initial value determined by the stored driving time information and decoder means for enabling said thermal head to be driven until said down-counter means reaches a predetermined count.

5. A printer according to claim 4, wherein:

said timer means includes clock means for counting down said down-counter means;

said decoder means outputs a first signal for enabling said thermal head to be driven until said clock means counts said down-counter means to said predetermined count and a second signal when said predetermined count is reached; and said down-counter means includes disabling means responsive to the output of said decoder means for preventing said clock from further counting down counter means when said decoder means outputs said second signal.

6. A printer according to claim 3, further including driving means for driving said thermal head in accordance with driving voltage information and driving time information stored in digital form in said memory means, said driving means including:

voltage converting means for providing one of a plurality of voltages corresponding to respective digital driving voltage information; and timer means for enabling said thermal head to be driven for one of a plurality of intervals corresponding to respective digital driving time information.

* * * * *

UNITED STATES PATENT AND TRADEMARK OFFICE
CERTIFICATE OF CORRECTION

PATENT NO. : 4,672,393
DATED : June 9, 1987
INVENTOR(S) : YOSHIO UCHIKATA, ET AL.

It is certified that error appears in the above-identified patent and that said Letters Patent is hereby corrected as shown below:

COLUMN 3

Line 23, "beings" should read --begins--.
Line 45, "the ink" should read --the inner ink--.

COLUMN 4

Line 33, "color ink" should read --color of ink--.
Line 38, "and same" should read --and the same--.

COLUMN 6

Line 22, "clock" should read --clock means--.
Line 23, "counter" should read --said down-counter--.

Signed and Sealed this

Tenth Day of November, 1987

*Attest:*

DONALD J. QUIGG

*Attesting Officer*

*Commissioner of Patents and Trademarks*